US006658222B2

(12) United States Patent
Kamijo et al.

(10) Patent No.: US 6,658,222 B2
(45) Date of Patent: Dec. 2, 2003

(54) METHOD AND APPARATUS FOR IMAGE FORMING CAPABLE OF EFFECTIVELY PERFORMING A FIXING PROCESS

(75) Inventors: Masahiko Kamijo, Kanagawa-ken (JP); Hidehiko Fujiwara, Tokyo (JP); Kohta Takenaka, Kanagawa-ken (JP); Osamu Kiuchi, Kanagawa-ken (JP)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 09/989,511

(22) Filed: Nov. 20, 2001

(65) Prior Publication Data

US 2002/0081121 A1 Jun. 27, 2002

(30) Foreign Application Priority Data

Nov. 22, 2000 (JP) ....................................... 2000-356153
Nov. 28, 2000 (JP) ....................................... 2000-360450
Jul. 23, 2001 (JP) ....................................... 2001-221903

(51) Int. Cl.[7] ................................................ F03G 15/00
(52) U.S. Cl. ............................ 399/68; 399/75; 399/330
(58) Field of Search .......................... 399/68, 322, 328, 399/75, 388, 394, 397, 405; 219/216

(56) References Cited

U.S. PATENT DOCUMENTS 5,485,259 A * 1/1996 Uehara et al. .............. 399/322
5,809,389 A * 9/1998 Tamura et al. .............. 399/322
6,151,466 A 11/2000 Fujiwara ....................... 399/92
6,269,230 B1 7/2001 Kiuchi ....................... 399/122
2002/0031382 A1 * 3/2002 Yura et al. .................. 399/330

FOREIGN PATENT DOCUMENTS

JP 61-256361 A * 11/1986
JP 11-161072 A * 6/1999
JP 2000-89605 A * 3/2000

OTHER PUBLICATIONS

Copy of claims from S.N. 09/860,594 filed May 21, 2001.
Copy of claims from S.N. 09/860,595 filed May 21, 2001.

* cited by examiner

*Primary Examiner*—Joan Pendegrass
(74) *Attorney, Agent, or Firm*—Cooper & Dunham LLP

(57) ABSTRACT

An image forming apparatus includes a photosensitive member, a transfer mechanism, a fixing mechanism, a sheet ejection mechanism, and a driving source. The transfer mechanism including a transfer roller that transfers a toner image carried on a photosensitive member onto a recording sheet. The fixing mechanism fixes the toner image onto the recording sheet with heat and pressure. The fixing mechanism includes a fixing roller and a pressure plate, and applies heat and pressure to the toner image on the recording sheet when the recording sheet is caused to pass through a fixing nip portion. The sheet ejection mechanism ejects the recording sheet and includes sheet ejection rollers. The driving source drives the photosensitive member, the transfer roller, the fixing roller, and the sheet ejection rollers to transfer the recording sheet at a linear speed in a substantially constant manner from the photosensitive member through to the sheet ejection mechanism.

27 Claims, 3 Drawing Sheets

METHOD AND APPARATUS FOR IMAGE FORMING CAPABLE OF EFFECTIVELY PERFORMING A FIXING PROCESS

BACKGROUND

1. Field

This patent specification relates to a method and apparatus for electrophotographic image forming, and more particularly to a method and apparatus for photographic image forming capable of effectively fixing an image with heat and pressure using a roller with a pressure plate.

2. Description of the Related Art

FIG. 5 illustrates a background fixing apparatus included in an image forming apparatus such as a printer, a facsimile apparatus, a copying machine, etc. The background fixing apparatus includes a fixing roller 50, a pressure roller 51 contacting the fixing roller under pressure, a fixing heater 52 mounted inside the fixing roller 50 to apply heat to the fixing roller 50, and a temperature detecting mechanism 53 for detecting a temperature of the fixing roller 50. The background fixing apparatus further includes a separation pawl 54 for separating a recording sheet from the fixing roller 50, a cleaning pad 55 contacting the fixing roller 50 to clean the surface of the cleaning roller 50, and a cleaning pad holder 56 for supporting the cleaning pad 55. The background fixing apparatus further includes a cleaning pad stopper 57 mounted at a position downstream in a rotation direction of the fixing roller 50 relative to the cleaning pad 57, an inlet guide plate 58 for guiding the recording sheet, a sheet ejection roller 59 for ejecting the recording sheet after the fixing process, and a roller 60 contacting the sheet ejection roller 59.

The recording sheet carrying a toner image thereon is guided by the inlet guide plate 58 into a nip portion formed between the fixing roller 50 and the pressure roller 51. The toner image on the recording sheet is subjected to a fixing process with heat and pressure at the nip portion and, after that, the recording sheet is ejected outside by the sheet ejection roller 59. As the recording sheet passes through the nip portion, the cleaning pad 55 cleans the residual toner off the surface of the fixing roller 50.

A surface temperature of the fixing roller 50 is detected by the temperature detecting mechanism 53, and a heating control is managed by a controller (not shown) based on the temperature detected by the temperature detecting mechanism 53.

Conventionally, fixing apparatuses commonly employs an infrared heater or a halogen heater as a fixing heater and a pair of a fixing roller and a pressure roller. In this configuration, the pressure roller has a relatively large thermal capacity due to a structure in which a metal core is covered with a silicone rubber layer on which a releasing layer of a material such as a fluoro resin is coated. Therefore, the temperature of the pressure roller typically cannot be increased rapidly. This can become a cause of a failure of the fixing process. Also, the above-mentioned configuration requires a relatively high component cost. Moreover, this configuration needs an application of a relatively high fixing pressure to form a sufficient nip width between the fixing roller and the pressure roller, stressing the recording sheet in a way that can produce a fixing wrinkle in the recording sheet.

A different fixing apparatus has been proposed to address at least some of the above-mentioned problems. This fixing apparatus uses a sheet-shaped pressure plate that presses the fixing roller to form a nip for fixing a toner image when a recording sheet is passing through the nip. This sheet-shaped pressure plate can be heated quickly and is capable of forming a sufficient nip width, thereby improving a thermal efficiency in comparison to the earlier-described fixing apparatus.

In general, transportation speeds V1, V2, and V3 of the sheet transfer mechanism, the fixing mechanism, and the sheet ejection mechanism, respectively, have relationships expressed as V1>V2 and V3>V2.

In the background fixing apparatus using the pressure roller, a gripping force relative to the recording sheet can easily be obtained because the pressure roller itself is rotated, so that the transportation of the recording sheet would not be adversely affected by a phenomenon in which the recording sheet gripped by the fixing roller and the pressure roller is pulled by the sheet ejection mechanism or pushed by the fixing roller and the pressure roller.

In the background fixing apparatus using the sheet-shaped pressure plate instead of the pressure roller, however, the transportation force of the fixing roller is generally less than those of the transfer roller and the sheet ejection roller and therefore the recording sheet is mainly transferred by the transportation force of the transfer roller when the recording sheet passes through the fixing apparatus. Accordingly, if the above-mentioned relationships associated with the transportation speeds of the rollers are satisfied in the background fixing apparatus using the sheet-shaped pressure plate, that is the relationships V1>V2 and V3>V2 are satisfied, as in the case of the fixing apparatus using the pressure roller, problem can arise if the recording sheet gripped by the fixing roller and the pressure plate is undesirably pulled by the sheet ejection mechanism or pushed by the fixing roller and the pressure roller. In such a case, the transportation of the recording sheet may become unstable at the nip, causing disruptions of the image forming operations.

SUMMARY

This patent specification describes a novel image forming apparatus. In one example, a novel image forming apparatus includes a photosensitive member, a transfer mechanism, a fixing mechanism, a sheet ejection mechanism, and a driving source. The photosensitive member is arranged and configured to carry a toner image thereon. The transfer mechanism is arranged and configured to transfer the toner image carried on the photosensitive member onto a recording sheet. The transfer mechanism including a transfer roller. The fixing mechanism is arranged and configured to fix the toner image onto the recording sheet with heat and pressure. The fixing mechanism includes a fixing roller including a cylindrical roller member containing a heater and a pressure plate having a sheet shape, having a property of a leaf spring, and contacting the fixing roller under pressure. Such a fixing mechanism applies heat and pressure to the toner image carried on the recording sheet when the recording sheet is caused to pass through a fixing nip portion formed between the fixing roller and the pressure plate. The sheet ejection mechanism is arranged and configured to eject the recording sheet coming out from the fixing mechanism. The sheet ejection mechanism includes a pair of sheet ejection rollers. The driving source is arranged and configured to drive the photosensitive member, the transfer roller, the fixing roller, and the sheet ejection rollers to transfer the recording sheet at a linear speed in a substantially steady manner from the photosensitive member through to the sheet ejection mechanism.

The driving source may drive the photosensitive member, the transfer roller, the fixing roller, and the sheet ejection rollers to transfer the recording sheet at a substantially constant speed from the photosensitive member through to the sheet ejection mechanism within a range to cover variations of the linear speeds of the fixing roller and the sheet ejection rollers due to a thermal expansion.

The linear speed of the fixing roller may be set to a value based on a diameter of fixing roller at an allowable lowest temperature and the sheet ejection rollers can be made of material having suitable properties of thermal expansion and elasticity.

The linear speed of the sheet ejection rollers may be adjusted in accordance with a thickness of the material having properties of thermal expansion and elasticity.

The recording sheet may be caused to contact at least one of the transfer roller and the sheet ejection rollers during the time the recording sheet passes through the fixing mechanism.

This patent specification further describes a novel image forming method. In one example, a novel image forming method includes the steps of providing and driving. The providing step provides a photosensitive member for carrying a toner image thereon and a transfer mechanism for transferring the toner image carried on the photosensitive member onto a recording sheet. The transfer mechanism includes a transfer roller. The providing step further provides a fixing mechanism for fixing the toner image onto the recording sheet with heat and pressure. The fixing mechanism includes a fixing roller including a cylindrical roller member containing a heater and a pressure plate having a sheet shape, having a property of a leaf spring, and contacting the fixing roller under pressure. The fixing mechanism applies heat and pressure to the toner image carried on the recording sheet when the recording sheet is caused to pass through a fixing nip portion formed between the fixing roller and the pressure plate. The providing step further provides a sheet ejection mechanism for ejecting the recording sheet coming out from the fixing mechanism. The sheet ejection mechanism includes a pair of sheet ejection rollers. The driving step drives the photosensitive member, the transfer roller, the fixing roller, and the sheet ejection rollers to transfer the recording sheet at a linear speed in a substantially steady manner from the photosensitive member through to the sheet ejection mechanism.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
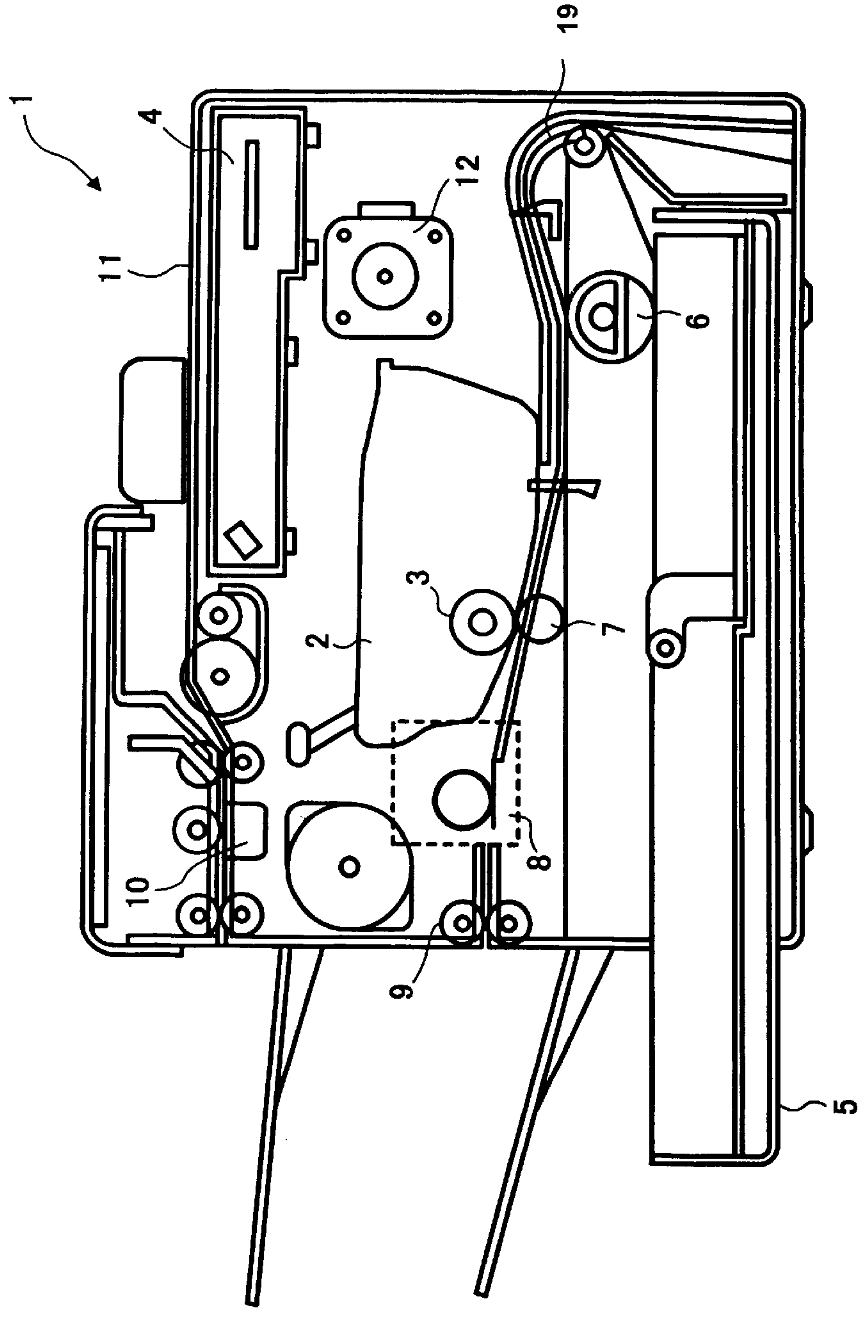
FIG. 1 is a schematic diagram of a facsimile apparatus according to a preferred embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is shown a main portion of a facsimile apparatus 1 according to a preferred embodiment. As illustrated in FIG. 1, the facsimile apparatus 1 includes a process cartridge 2, an optical writing unit 4, a sheet supply unit 5, a sheet feed roller 6, a transfer roller 7, a fixing unit 8, a pair of sheet ejection rollers 9, a close-contact sensor 10, an original placement plate 11, a main motor 12, and a sheet path 19. The process cartridge 2 is detachably mounted to the facsimile apparatus 1 and integrates various process units including a photosensitive member 3 to perform an image forming operation according to an electrophotographic method. The optical writing unit 4 emits light (i.e., a laser beam) modulated according to image data and scans the photosensitive member 3 with the light. The sheet supply unit 5 contains a number of recording sheets. The feed roller 6 picks up a recording sheet from the sheet supply unit 5 and transfers it into the sheet path 19. The transfer roller 7 presses the photosensitive member 3 via a recording sheet supplied from the sheet supply unit 5 and transfers a toner image formed on the surface of the photosensitive member 3 onto the recording sheet. The fixing unit 8 performs a fixing process for fixing the toner image carried on the recording sheet onto the recording sheet. The sheet ejection rollers 9 ejects the recording sheet after the fixing process performed by the fixing unit 8. The close-contact sensor 10 reads an image of an original placed on the original placement plate 11. The main motor 12 drives a mechanism for transferring the recording sheet. For example, the photosensitive member 3, the transfer roller 7, a fixing roller 13 (FIG. 2), and the sheet ejection rollers 9 are driven by the main motor such that these components rotate in a common linear velocity via a transmission mechanism (not shown).

Figure 2:
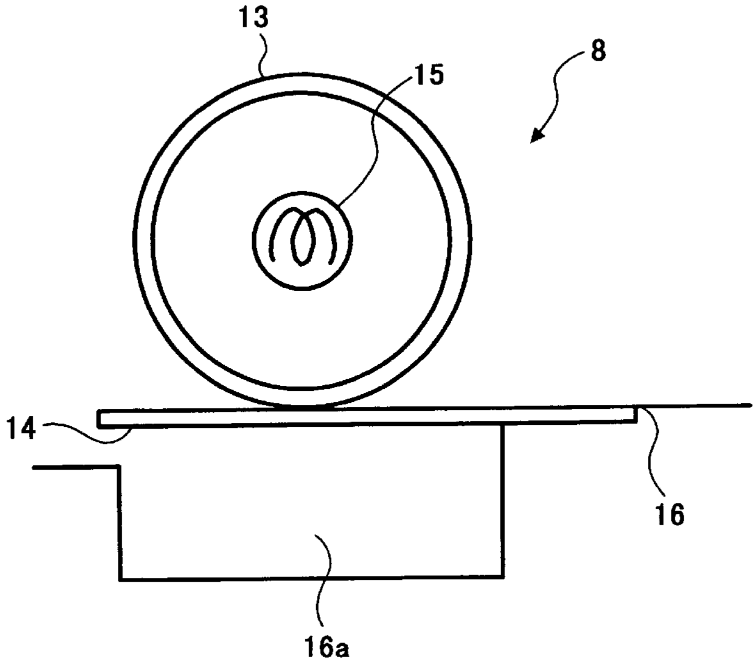
FIG. 2 is an illustration for explaining a structure of a fixing apparatus included in the facsimile apparatus of FIG. 1.

An original placed on the original placement plate 11 is transferred for reading by the close-contact sensor 10 and is ejected outside, by an original transferring mechanism (not shown). During this process, an image of the original is optically read by the close-contact sensor 10 and the read image is converted into image data. The thus obtained image data, or image data input from an external system, is sent to the optical writing unit 4. The optical writing unit 4 generates and modulates a light beam in accordance with the image data, and scans an evenly charged surface of the photosensitive member 3 so that an electrostatic latent image is formed thereon. This electrostatic latent image is visualized with toner into a toner image which is then transferred by the transfer roller 7 onto the recording sheet sent from the sheet supply unit 5. After the transfer process, the recording sheet is transferred to the fixing unit 8 along a guide plate 16 (FIG. 2). In the fixing unit 8, the toner image carried on the recording sheet is subjected to heat and pressure so that the toner image is melted and is fixed on the recording sheet. After that, the recording sheet having the fixed toner image thereon is ejected outside by the sheet ejection rollers 9.

FIG. 2 illustrates a structure of the fixing unit 8 that includes the above-mentioned fixing roller 13, a pressure plate 14, a heater 15, and the above-mentioned guide plate 16. The heater 15 is disposed inside the fixing roller 13. The heater 15 may be an infrared heater, a halogen heater, an induction heater, a plate-shaped heater, etc. The pressure plate 14 has a sheet shape and is used as a leaf spring. The pressure plate 14 is made of a metal plate, such as a stainless steel plate, a copper plate, or the like, having a relatively high thermal conductivity.

As illustrated in FIG. 2, the guide plate 16 includes a dent 16*a* at a region facing the fixing roller 13. The pressure plate 14 shaped in the sheet form has one end fixed with adhesion or screws to the guide plate 16 at a horizontal edge portion upstream in a sheet transfer direction relative to the fixing roller 13. The other end of the pressure plate 14 is free and is movable in a vertical direction.

A position of the fixing roller 13 or the pressure plate 14 is arranged so that the pressure plate 14 contacts the fixing roller 13 under a predetermined pressure. That is, a nip pressure which is a pressure that the pressure plate applies to the fixing roller 13 is determined by a spring force of the pressure plate 14.

The recording sheet transferred by the transfer roller 7 is guided by the guide plate 16 to the nip portion formed between the fixing roller 13 and the pressure plate 14 in the fixing unit 8 and is subjected to heat and pressure when passing through the nip portion.

Figure 3:
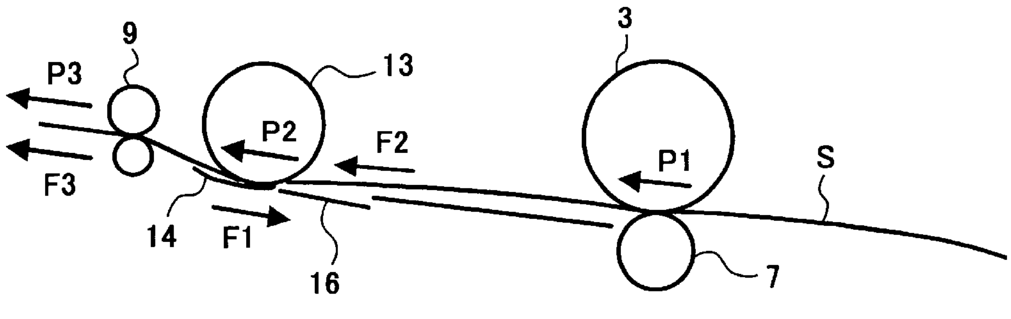
FIG. 3 is an illustration for explaining generation of loads associated with a recording sheet in the facsimile apparatus.

As illustrated in FIG. 3, three transportation forces P1, P2, and P3 indicated with the respective arrows are defined as P1>P2>>P3, where P1 is a transportation force at the nip portion between the photosensitive member 3 and the transfer roller 7, P2 is a transportation force at the nip portion between the fixing roller 13 and the pressure plate 14, and P3 is a transportation force at the nip portion between the pair of the sheet ejection rollers 9. In FIG. 3, the recording sheet is indicated with a letter S. Since the fixing roller 13 does not generate a strong transportation force, the transportation for transporting the leading edge of the recording sheet S from the transfer roller 7 to the sheet ejection rollers 9 mainly relies on the transportation force P1 generated at the nip portion between the photosensitive member 3 and the transfer roller 7. The recording sheet S is transferred by the transportation forces of the transfer roller 7 and the sheet ejection rollers 9 during the time the transfer roller 7 and the sheet ejection rollers 9 contact the recording sheet S. After the trailing edge of the recording sheet S is disengaged from the transfer roller 7, the recording sheet S is transferred by the transportation force of the sheet ejection rollers 9.

When transportation speeds V1, V2, and V3 of the transfer roller 3, the fixing roller 13, and the sheet ejection rollers 9 are set to values satisfying relationships of V1>V2, V3>V2, as in the case of the background image forming apparatus, the recording sheet S is transferred at the transportation speed V2 at the beginning of the transportation and, as the transportation proceeds, the recording sheet S tends to generate a slack between the transferring region and the fixing region due to a difference of the linear transportation speed between the transfer roller 7 and the fixing roller 13. Because of a stiffness of the recording sheet against the above-mentioned slack, the recording sheet S provides a load F1 to the fixing nip portion, as illustrated in FIG. 3. If the load F1 is greater than a gripping force F2 at the fixing nip portion, the recording sheet S could slip at the fixing nip portion. As a result, the recording sheet S could enter into the fixing nip portion at a speed faster than a predetermined speed, resulting in disruptions in the image forming. Also, a difference of linear speed between the sheet ejection rollers 9 and the fixing roller 13 can produce a tension F3 relative to the recording sheet S at a region between the fixing nip portion and the ejection nip portion. Likewise, the recording sheet S may be caused to enter into the fixing nip portion at a speed faster than the predetermined speed when the tension F3 at the ejection nip portion is greater than the gripping force F2 at the fixing nip portion. As a result, disruptions in the image forming may occur.

In the presently preferred embodiment, the photosensitive member 3, the transfer roller 7, the fixing roller 13, and the sheet ejection rollers 9 are configured to be rotated at the common linear speed and therefore the recording sheet S is transferred at a constant speed between the photosensitive member 3 to the sheet ejection rollers 9. Consequently, since disruptions in the image forming can be prevented, a preferred transportation performance can be obtained without the needs of increasing the gripping force.

In the fixing unit 8, the fixing roller 13 thermally expands due to heat application by the heater 15 and the sheet ejection rollers 9 thermally expand when the heated recording sheet passes through the nip portion of the sheet ejection rollers 9. When the fixing roller 13 and the sheet ejection rollers 9 thermally expand, their linear speeds are increased. As a result, a balance between the linear speeds of the fixing roller 13, the transfer roller 7, and the sheet ejection rollers 9 can be adversely affected during the recording process. Therefore, it is preferred to allow for such thermal expansion when values of the linear speeds of the sheet ejection rollers 9 and the fixing roller 13 are determined. For example, degrees of the thermal expansion may be different between the cases when recording is made on only one recording sheet and on several tens of recording sheets. Little effect may be seen due to this difference of the linear speed during a relatively small number of successive recording operations. However, during an execution of the successive recording operations for a relatively long time period, an effect due to the difference of the linear speed preferably should be taken into account, particularly between the sheet ejection rollers 9 and the fixing roller 13.

When the fixing roller 13 increases its diameter due to successive recording operations and accordingly its peripheral linear speed is increased, the fixing roller 13 can merely slip relative to the recording sheet between the transfer roller 7 and the fixing roller 13 and disruptions in the image forming are not caused. However, when the linear speed of the fixing roller 13 becomes greater than that of the sheet ejection rollers 9, the recording sheet can slack therein between the fixing nip portion and the ejection nip portion. This slack may produce a force pushing the recording sheet relative to the fixing nip portion at an upstream side in the sheet transfer direction, resulting in disruptions of the image forming.

In the presently preferred embodiment, the linear speed of the fixing roller 13 is determined on a basis of a diameter of the fixing roller 13 at the allowable lowest temperature, and the linear speeds of the transfer roller 7 and the sheet ejection rollers 9 are set substantially equal to the thus-determined linear speed of the fixing roller 13. Therefore, the linear speed of the fixing roller 13 is expected to be greater than that of the transfer roller 7 during the regular operations, and disruptions of the image forming due to an undesirable difference of the linear speed can be prevented during passage of the sheet through the transfer nip portion and the fixing nip portion.

In addition, the sheet ejection rollers 9 are made of a material, such as an elastomer resin (i.e., sponge, urethane, etc.), a rubber (i.e., EPDM, silicone rubber, etc.), or the like, that has a characteristic thermal expansion. The thermal expansion of rubber can be represented by a formula;

the rubber thermal expansion=*b*×*â*×*ÄT*, and *â*=3(1−*b*/*D*)*á*, wherein â represents a thermal expansion coefficient in a thickness direction, b represents a thickness of rubber, D represents a diameter of a roller, â represents a thermal expansion coefficient for the rubber in an inverse unit of temperature degrees in Celsius, and ÄT represents a temperature rise in a unit of temperature degrees. The thickness of rubber is defined by selecting values of the above-mentioned elements included in the formula such that the linear speed of the sheet ejection rollers 9 changes with temperature in a preferred way in accordance with the variations of the linear speed of the fixing roller 13.

With the above-mentioned structure, the linear speeds of the transfer roller 7, the sheet ejection rollers 9, and the fixing roller 13 are kept constant during the beginning of the image recording and therefore the disruptions of the image forming are prevented. Then, as the successive image forming operations are performed, the sheet ejection rollers 9 and the fixing roller 13 expand thermally so that the transfer speeds fall in the relationships represented as V3>V2>V1, such that no slack is produced in the recording sheet between the transfer nip region and the ejection nip portion and the fixing roller 13 can merely slips on the recording sheet as needed without causing disruptions of the image forming. Also, after the trailing edge of the recording sheet passes through the transfer roller 7, no slack is caused in the recording sheet between the fixing nip portion and the ejection nip portion. Thereby, no force is generated that would push the recording sheet backward toward the fixing nip portion from the ejection nip portion. As a result, since the sheet ejection rollers 9 also expand thermally, the difference of the linear speeds of the fixing roller 13 and the sheet ejection rollers 9 is absorbed so that the transportation is executed in a stable manner.

As for a relationship between the linear speeds of the transfer roller 7 and the fixing roller 13 as well as a relationship between the linear speeds of the sheet ejection rollers 9 and the fixing roller 13, it is possible to maintain the rotations of the transfer roller 7, the fixing roller 13, and the sheet ejection rollers 9 at a constant speed even when they expand thermally, by provisions and controls of individual driving sources relative to these rollers. However, to provide an individual driving source to each roller would increase cost. Therefore, it is preferable to drive the transfer roller 7, the fixing roller 13, and the sheet ejection rollers 9 with a single driving source in order to decrease costs. In this case, although the linear speed may be varied due to the thermal expansion, as described above, the fixing operation can be performed in a preferable manner when the linear speed difference between the transfer roller 7 and the fixing roller 13 and the linear speed difference between the sheet ejection rollers 9 and the fixing roller 13 are set to 1 mm/s or less.

Figure 4:
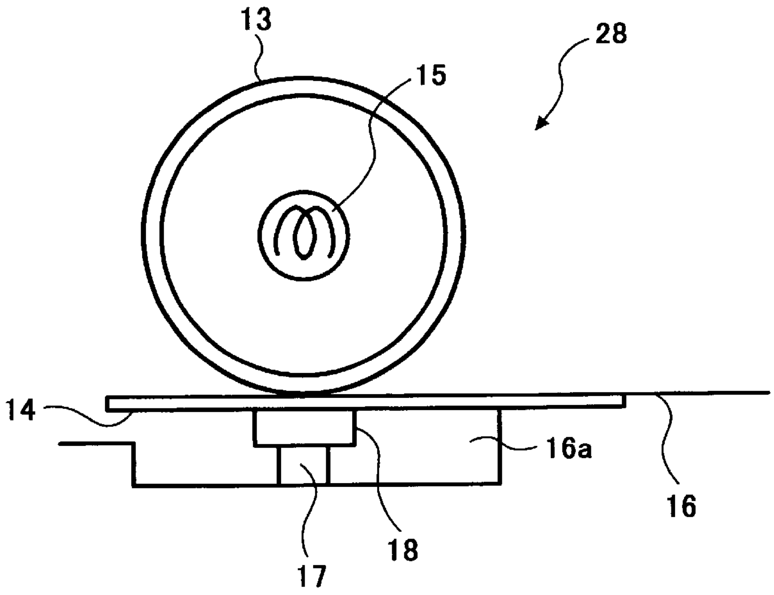
FIG. 4 is an illustration for explaining a structure of another fixing apparatus.
Figure 5:
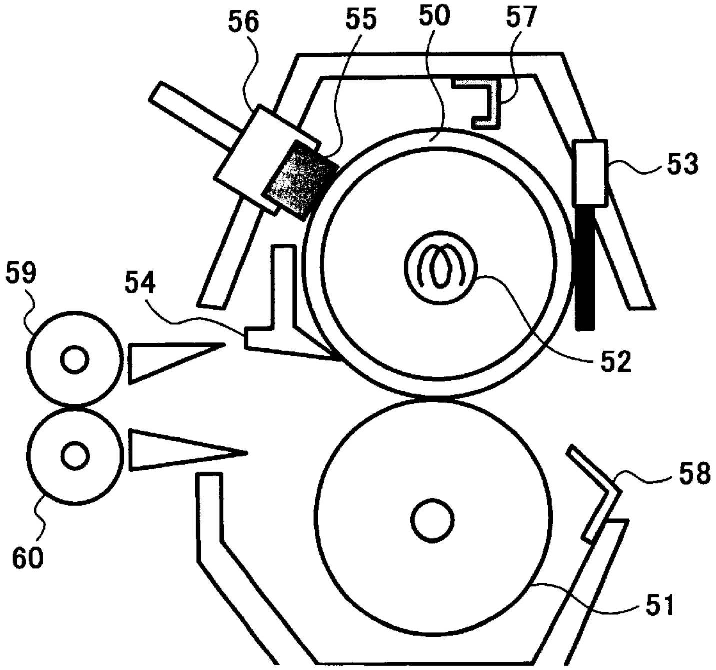
FIG. 5 (Prior Art)
FIG. 5 is a schematic diagram for explaining a background fixing apparatus.

FIG. 4 illustrates another fixing unit 28 according to a presently preferred embodiment. The fixing unit 28 of FIG. 4 is similar to that of FIG. 2, except for a temperature sensor 18 and a sensor supporter 17. The sensor supporter 17 has elasticity in a vertical direction and supports the temperature sensor 18. The temperature sensor 18 is mounted to both edge portions of the rear surface of the pressure plate 14 so as to face, via the pressure plate 14, the fixing roller 13 at its side edges which contact the pressure plate 14 but do not contact the recording sheet.

If the fixing unit 28 for some reason goes into an abnormal operation state and the fixing roller 13 becomes uncontrollable in temperature and overheats, the temperature sensor 18 detects overheating and then the power to the heater 15 is shut down through a suitable control switch.

Numerous additional modifications and variations are possible in light of the above teachings. It is therefore to be understood that within the scope of the appended claims, the disclosure of this patent specification may be practiced other than as specifically described herein.

This application is based on and claims priority of Japanese patent applications, No. JPAP2000-356153 filed on Nov. 22, 2000, No. JPAP2000-360450 filed on Nov. 28, 2000, and No. JPAP2001-221903 filed on Jul. 23, 2001 in the Japanese Patent Office, the entire contents of which are incorporated by reference herein.

What is claimed is:

1. An image forming apparatus, comprising:

a photosensitive member arranged and configured to carry a toner image thereon;

a transfer mechanism arranged and configured to transfer said toner image carried on said photosensitive member onto a recording sheet, said transfer mechanism including a transfer roller;

a fixing mechanism arranged and configured to fix said toner image onto said recording sheet with heat and pressure, said fixing mechanism comprising:

a fixing roller including a cylindrical roller member containing a heater; and a pressure plate having a sheet shape, having a property of a leaf spring, and contacting said fixing roller under pressure, wherein said fixing mechanism applies heat and pressure to said toner image carried on said recording sheet when said recording sheet is caused to pass through a fixing nip portion formed between said fixing roller and said pressure plate, a sheet ejection mechanism arranged and configured to eject said recording sheet coming out from said fixing mechanism, said sheet ejection mechanism including a pair of sheet ejection rollers; and a driving source arranged and configured to drive said photosensitive member, said transfer roller, said fixing roller, and said sheet ejection rollers to transfer said recording sheet at a linear speed in a substantially constant manner from said photosensitive member through to said sheet ejection mechanism.

2. An image forming apparatus as defined in claim 1, wherein said driving source drives said photosensitive member, said transfer roller, said fixing roller, and said sheet ejection rollers to transfer said recording sheet at a substantially constant speed from said photosensitive member through to said sheet ejection mechanism within a range to cover variations of said linear speeds of said fixing roller and said sheet ejection rollers due to a thermal expansion.

3. An image forming apparatus as defined in claim 1, wherein said linear speed of said fixing roller is set to a value based on a diameter of the fixing roller at an allowable lowest temperature and said sheet ejection rollers are made of material having selected properties of thermal expansion and elasticity.

4. An image forming apparatus as defined in claim 3, wherein said linear speed of said sheet ejection rollers is set in accordance with a thickness of said material having properties of thermal expansion and elasticity.

5. An image forming apparatus as defined in claim 1, wherein said recording sheet is caused to contact at least one of said transfer roller and said sheet ejection rollers during the time said recording sheet passes through said fixing mechanism.

6. An image forming apparatus, comprising:

photosensitive means for carrying a toner image thereon;

transferring means for transferring said toner image formed on said photosensitive means onto a recording sheet, said transferring means including transferring roller means;

fixing means for fixing said toner image onto said recording sheet with heat and pressure, said fixing means comprising:

fixing roller means including a cylindrical roller member containing inside heating means for heating said fixing roller; and pressure plate means for pressing said recording sheet to said fixing roller means, said pressure plate means having a sheet shape and a property of a leaf spring, wherein said fixing means applies heat and pressure to said toner image carried on said recording sheet when said recording sheet is caused to pass through a fixing nip portion formed between said fixing roller means and said pressure plate means, sheet ejecting means for ejecting said recording sheet coming out from said fixing means, said sheet ejection means including a pair of sheet ejecting roller means; and driving source means for driving said photosensitive means, said transferring roller means, said fixing roller means, and said sheet ejecting roller means to transfer said recording sheet at a linear speed in a substantially constant manner from said photosensitive means through to said sheet ejecting means.

7. An image forming apparatus as defined in claim 6, wherein said driving source means drives said photosensitive means, said transferring roller means, said fixing roller means, and said sheet ejecting roller means to transfer said recording sheet at a substantially constant speed from said photosensitive means through to said sheet ejecting means within a range to cover variations of said linear speeds of said fixing roller means and said sheet ejecting roller means due to a thermal expansion.

8. An image forming apparatus as defined in claim 6, wherein said linear speed of said fixing roller means is set to a value based on a diameter of the fixing roller means at an allowable lowest temperature and said sheet ejecting roller means are made of material having selected properties of thermal expansion and elasticity.

9. An image forming apparatus as defined in claim 8, wherein said linear speed of said sheet ejecting roller means is set in accordance with a thickness of said material having properties of thermal expansion and elasticity.

10. An image forming apparatus as defined in claim 6, wherein said recording sheet is caused to contact at least one of said transferring roller means and said sheet ejecting roller means during the time said recording sheet passes through said fixing means.

11. A method of image forming, comprising the steps of:

providing a photosensitive member for carrying a toner image thereon, and a transfer mechanism for transferring said toner image carried on said photosensitive member onto a recording sheet, said transfer mechanism including a transfer roller, and a fixing mechanism for fixing said toner image onto said recording sheet with heat and pressure, said fixing mechanism comprising:

a fixing roller including a cylindrical roller member containing a heater; and a pressure plate having a sheet shape, having a property of a leaf spring, and contacting said fixing roller under pressure, wherein said fixing mechanism applies heat and pressure to said toner image carried on said recording sheet when said recording sheet is caused to pass through a fixing nip portion formed between said fixing roller and said pressure plate, and a sheet ejection mechanism for ejecting said recording sheet coming out from said fixing mechanism, said sheet ejection mechanism including a pair of sheet ejection rollers; and driving for driving said photosensitive member, said transfer roller, said fixing roller, and said sheet ejection rollers to transfer said recording sheet at a linear speed in a substantially constant manner from said photosensitive member through to said sheet ejection mechanism.

12. A method as defined in claim 11, wherein said driving step drives said photosensitive member, said transfer roller, said fixing roller, and said sheet ejection rollers to transfer said recording sheet at a substantially constant speed from said photosensitive member through to said sheet ejection mechanism within a range to cover variations of said linear speeds of said fixing roller and said sheet ejection rollers due to a thermal expansion.

13. A method as defined in claim 11, wherein said linear speed of said fixing roller is set to a value based on a diameter of fixing roller at an allowable lowest temperature and said sheet ejection rollers are made of material having selected properties of thermal expansion and elasticity.

14. A method as defined in claim 13, wherein said linear speed of said sheet ejection rollers is set in accordance with a thickness of said material having properties of thermal expansion and elasticity.

15. A method as defined in claim 11, wherein said recording sheet is caused to contact at least one of said transfer roller and said sheet ejection rollers during the time said recording sheet passes through said fixing mechanism.

16. A method of forming an image comprising:

forming a toner image on a photosensitive member;

transferring the toner image from the photosensitive member onto a recording sheet;

said transferring including passing the recording sheet through a transfer nip between the photosensitive member and a transfer roller;

transporting the recording sheet with the toner image thereon in a sheet transport direction through a fixing nip between a heated fixing roller and a pressure plate that is in the shape of a leaf spring and presses against the fixing roller, to thereby fix the toner image onto the recording sheet;

engaging the recording sheet with the fixed toner image thereon that emerges from the fixing nip in said sheet transport direction in an ejection nip between ejection rollers; and driving said transfer roller, fixing roller and ejection rollers at speeds maintaining substantially the same speed of said recording sheet through said transfer nip, fixing nip and ejection nip in said sheet transport direction.

17. A method as in claim 16 including selecting thermal expansion properties of said fixing roller and said ejection rollers to maintain said substantially same speed through a range of operating temperature conditions thereof.

18. A method as in claim 16 in which a linear speed of said fixing roller along said sheet transport direction is set a value related to a diameter of said fixing roller at a lowest allowable operating temperature thereof.

19. An image forming apparatus comprising:

a photosensitive member, a latent image forming device forming a latent image on the photosensitive member, and a developing device developing the latent image into a toner image;

a transfer device including a transfer roller arranged relative to the photosensitive member to form a transfer nip therebetween for transferring the toner image from the photosensitive member onto a recording sheet passing through said transfer nip along a sheet feeding path;

a fixing station comprising a heated fixing roller and a pressure plate that is in the shape of a leaf spring and presses against the fixing roller to form a fixing nip therebetween, said fixing nip being downstream from said transfer nip along said sheet feeding path to receive a sheet with a toner image thereon transferred thereto at said transfer nip and to fix the toner image onto the recording sheet;

ejection rollers forming an ejection nip therebetween that is downstream from said fixing nip along said sheet feeding path to receive a sheet with a toner image thereon fixed at said fixing station and eject the received sheet; and a driving mechanism driving said transfer roller, fixing roller and ejection rollers at speeds maintaining substantially the same speed of said recording sheet through said transfer nip, fixing nip and ejection nip along said sheet feeding path.

20. An image forming apparatus as in claim 19 in which said fixing roller and said ejection rollers have thermal properties selected to maintain said substantially same speed through a range of operating temperature conditions thereof.

21. An image forming apparatus as in claim 19 in which said driving mechanism drives said fixing roller at a speed establishing a linear speed of said sheet through the fixing nip along said sheet transport direction at a value related to a diameter of said fixing roller at a lowest allowable operating temperature thereof.

22. An image forming apparatus, comprising:

a photosensitive member arranged and configured to carry a toner image thereon;

a transfer mechanism arranged and configured to transfer said toner image carried on said photosensitive member onto a recording sheet, said transfer mechanism including a transfer roller;

a fixing mechanism arranged and configured to fix said toner image onto said recording sheet with heat and pressure, said fixing mechanism comprising:

a fixing roller including a cylindrical roller member containing inside a heater; and a pressure plate having a sheet shape, having a property of a leaf spring, and contacting said fixing roller under pressure, wherein said fixing mechanism applies heat and pressure to said toner image carried on said recording sheet when said recording sheet is caused to pass through a fixing nip portion formed between said fixing roller and said pressure plate, a sheet ejection mechanism arranged and configured to eject said recording sheet come out from said fixing mechanism, said sheet ejection mechanism including a pair of sheet ejection rollers; and a driving source arranged and configured to transfer said recording sheet at a linear speed in a substantially constant manner at least from said photosensitive member through to at least said sheet ejection mechanism.

23. An image forming apparatus as in claim 22 in which said driving source is arranged and configured to transfer said recording sheet at a linear speed in a substantially constant manner from said photosensitive member through to said sheet ejection mechanism.

24. An image forming apparatus, comprising:

a photosensitive member arranged and configured to carry a toner image thereon;

a transfer mechanism arranged and configured to transfer said toner image carried on said photosensitive member onto a recording sheet, said transfer mechanism including a transfer roller;

a fixing mechanism arranged and configured to fix said toner image onto said recording sheet with heat and pressure, said fixing mechanism comprising:

a fixing roller including a cylindrical roller member containing inside a heater; and a pressure plate having a sheet shape, having a property of a leaf spring, and contacting said fixing roller under pressure, wherein said fixing mechanism applies heat and pressure to said toner image carried on said recording sheet when said recording sheet is caused to pass through a fixing nip portion formed between said fixing roller and said pressure plate, a sheet ejection mechanism arranged and configured to eject said recording sheet come out from said fixing mechanism, said sheet ejection mechanism including a pair of sheet ejection rollers; and a driving source arranged and configured to transfer said recording sheet at a linear speed in a substantially constant manner at least from said photosensitive member through to at least said fixing mechanism.

25. An image forming apparatus as in claim 24 in which said driving source is arranged and configured to transfer said recording sheet at a linear speed in a substantially constant manner from said photosensitive member through said fixing mechanism.

26. An image forming apparatus, comprising:

a photosensitive member arranged and configured to carry a toner image thereon;

a transfer mechanism arranged and configured to transfer said toner image carried on said photosensitive member onto a recording sheet, said transfer mechanism including a transfer roller;

a fixing mechanism arranged and configured to fix said toner image onto said recording sheet with heat and pressure, said fixing mechanism comprising:

a fixing roller including a cylindrical roller member containing inside a heater; and a pressure plate having a sheet shape, having a property of a leaf spring, and contacting said fixing roller under pressure, wherein said fixing mechanism applies heat and pressure to said toner image carried on said recording sheet when said recording sheet is caused to pass through a fixing nip portion formed between said fixing roller and said pressure plate, a sheet ejection mechanism arranged and configured to eject said recording sheet come out from said fixing mechanism, said sheet ejection mechanism including a pair of sheet ejection rollers; and a driving source arranged and cofigured to transfer said recording sheet at a linear speed in a substantially constant manner at least from said fixing mechanism through to at least said sheet ejection mechanism.

27. An image forming apparatus as in claim 26 in which said driving source is arranged and configured to transfer said recording sheet at a linear speed in a substantially constant manner from said fixing mechanism through to said sheet ejection mechanism.

* * * * *